United States Patent
Yoshida et al.

(10) Patent No.: US 11,059,178 B2
(45) Date of Patent: Jul. 13, 2021

(54) METHOD OF CORRECTING POSITION OF ROBOT AND ROBOT

(71) Applicants: KAWASAKI JUKOGYO KABUSHIKI KAISHA, Kobe (JP); KAWASAKI ROBOTICS (USA), INC., Wixom, MI (US)

(72) Inventors: Masaya Yoshida, Himeji (JP); Hajime Nakahara, San Jose, CA (US); Takao Yamaguchi, Fremont, CA (US); Daniel Chung, Castro Valley, CA (US)

(73) Assignees: KAWASAKI JUKOGYO KABUSHIKI KAISHA, Kobe (JP); KAWASAKI ROBOTICS (USA), INC., Wixom, MI (US)

( * ) Notice: Subject to any disclaimer, the term of this patent is extended or adjusted under 35 U.S.C. 154(b) by 257 days.

(21) Appl. No.: 16/234,084

(22) Filed: Dec. 27, 2018

(65) Prior Publication Data

US 2020/0206933 A1 Jul. 2, 2020

(51) Int. Cl.
*B25J 9/16* (2006.01)

(52) U.S. Cl.
CPC ........... *B25J 9/1692* (2013.01); *B25J 9/1694* (2013.01)

(58) Field of Classification Search
CPC ...... B25J 9/1692; B25J 9/1694; B25J 9/1653; B25J 9/1612; G05B 2219/39007; G05B 2219/39025
See application file for complete search history.

(56) References Cited

U.S. PATENT DOCUMENTS

| | | | |
|---|---|---|---|
| 9,796,086 B2 | 10/2017 | Nakaya et al. | |
| 2009/0157226 A1* | 6/2009 | de Smet | G01B 11/002 700/254 |
| 2020/0298409 A1* | 9/2020 | Hsiao | B25J 9/1697 |
| 2020/0411347 A1* | 12/2020 | Kopec | H01L 21/67265 |

* cited by examiner

*Primary Examiner* — Robert T Nguyen

(74) *Attorney, Agent, or Firm* — Oliff PLC

(57) ABSTRACT

A position correction method includes: a step of opposing a hand to a target by moving the hand such that the hand becomes in a predetermined first initial posture; a first position detection step of detecting a position of the target from a rotation angle of a rotation axis when the target blocks a detection light by swinging the hand; a step of opposing the hand to the target by moving the hand such that the hand becomes a predetermined second initial posture different from the first initial posture; a second position detection step of detecting a position of the target from the rotation angle of the rotation axis when the target blocks the detection light by swinging the hand; and a correction amount arithmetic step of obtaining rotation angle correction amounts of the second axis and the third axis based on a difference between the position of the target acquired in the first initial posture and the position of the target acquired in the second initial posture.

4 Claims, 6 Drawing Sheets

METHOD OF CORRECTING POSITION OF ROBOT AND ROBOT

BACKGROUND OF THE INVENTION

1. Field of the Invention

The present invention relates to a robot position correction method and a robot. Position correction includes zeroing correction or teaching position correction.

2. Description of the Related Art

As disclosed in U.S. Pat. No. 9,796,086 B2, a substrate conveying robot includes a sensor attached to a front end of a hand. In such a robot, in order to improve teaching accuracy, a deviation between an actual position of the sensor and a position recognized by the robot is corrected by swinging the hand around a certain pivot.

In the technique of U.S. Pat. No. 9,796,086 B2, the deviation generated on a single pivot can be corrected. On the other hand, the robot typically has a plurality of rotation axes. For this reason, there is a possibility that there is room for improvement of the technique of correcting the deviation.

SUMMARY OF THE INVENTION

An object of the present invention is to improve the position control accuracy of the robot.

According to one aspect of the present invention, a method of correcting a position of a robot, the robot including: a base; an arm that is formed by connecting at least two links and connected to the base; a hand that is connected to the arm and includes a first front end and a second front end that are bifurcated; a sensor that is configured to propagate detection light between the first front end and the second front end and to detect whether a target blocks the detection light; and a control device that controls operation of the arm and the hand, a plurality of rotation axes being set so as to be parallel to each other at each of a plurality of connection portions, the plurality of connection portions including a connection portion of the base and the arm, a connection portion of two adjacent links among the links constituting the arm, and a connecting portion of the arm and the hand. Assuming that three of the rotation axes are a first axis, a second axis, and a third axis in order from the rotation axis closest to the base, the method includes: a step of opposing the hand to the target by moving the hand such that the hand becomes in a predetermined first initial posture; a first position detection step of detecting a rotation angle of the rotation axis when the target blocks the detection light by swinging the hand; a step of opposing the hand to the target by moving the hand such that the hand becomes a predetermined second initial posture different from the first initial posture; a second position detection step of detecting the rotation angle of the rotation axis when the target blocks the detection light by swinging the hand; and a correction amount arithmetic step of obtaining rotation angle correction amounts of the second axis and the third axis based on a difference between the rotation angle of the rotation axis acquired in the first initial posture and the rotation angle of the rotation axis acquired in the second initial posture.

With this configuration, not only the position of the third axis but also the position of the second axis can be corrected, and the position control accuracy of the robot is improved.

DETAILED DESCRIPTION OF PREFERRED EMBODIMENTS

Figure 1:
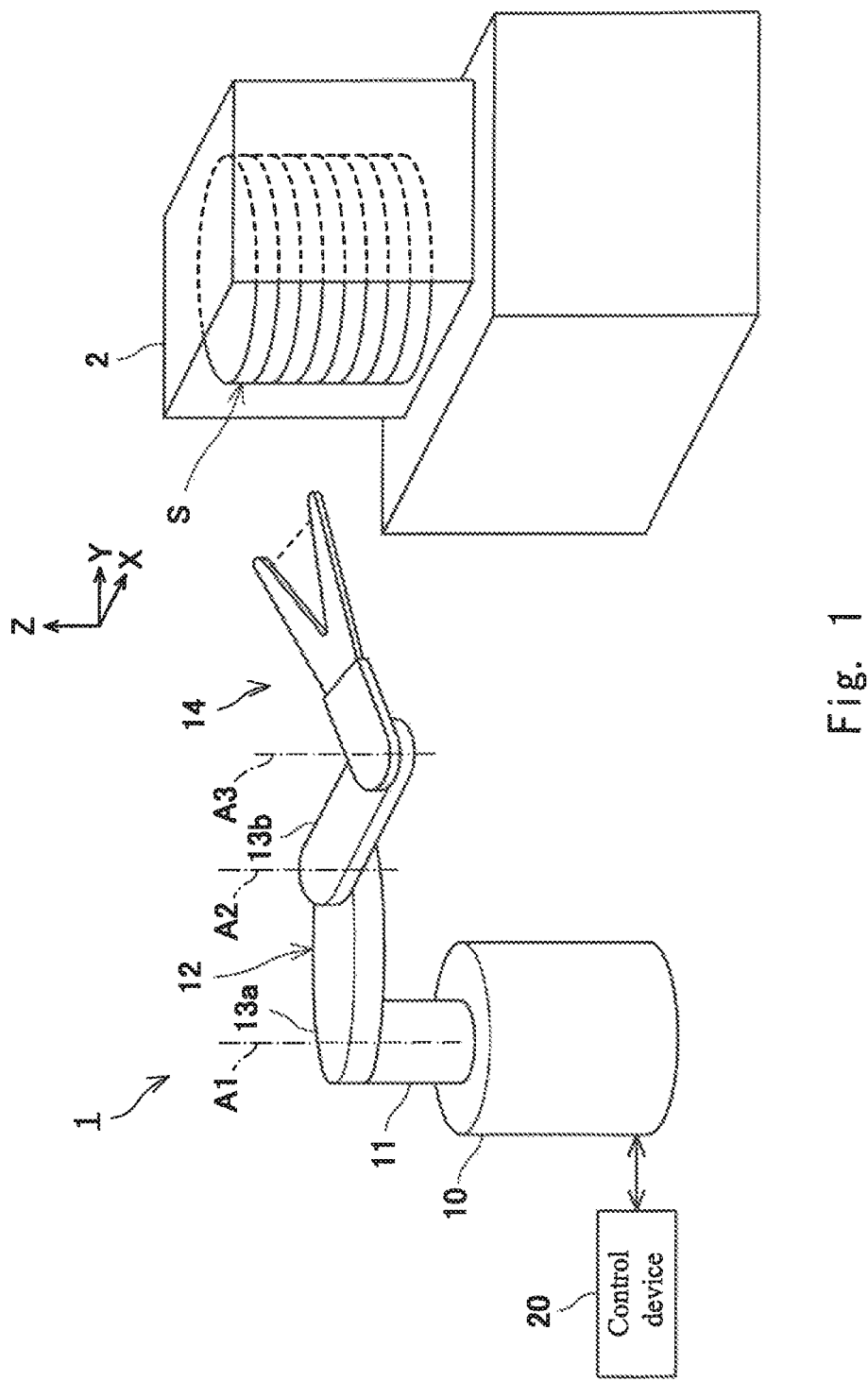
FIG. 1 is a conceptual diagram illustrating a robot according to a first embodiment.

Embodiments will be described below with reference to the drawings. Identical or corresponding elements are denoted by the same reference numerals throughout the drawings, and overlapping description is omitted.

FIG. 1 illustrates a robot 1. The robot 1 can be used to transfer a substrate S in a semiconductor processing facility that manufactures a semiconductor element. The substrate S is a material of a semiconductor element called a wafer, and is formed in a disk shape. A plurality of processing apparatuses are installed in the semiconductor processing facility in order to perform various treatments such as heat treatment, impurity introduction treatment, thin film formation treatment, lithography treatment, cleaning treatment, and flattening treatment, on the substrate S.

For example, the robot 1 transfers the substrate S accommodated in a cassette 2 to the processing apparatus. For example, the cassette 2 is a Front-Opening Unified Pod (FOUP). Although the single cassette 2 is illustrated, an EFEM (Equipment Front End Module) intensively including a plurality of (for example, two or three) cassettes 2 may be installed in the semiconductor processing facility. In this case, preferably the robot 1 is configured to be accessible in each cassette 2 without a travel device.

The robot 1 includes a base 10, an arm 12, a hand 14, a sensor 17, and a control device 20.

The base 10 is fixed to a proper place (for example, a horizontal floor surface) of the semiconductor processing facility (or may be supported on a facility floor surface with the travel device interposed therebetween). Hereinafter, a direction will be described assuming that the base 10 is properly installed on the horizontal floor surface.

An arm 12 is connected to the base 10 with a lifting shaft 11 interposed therebetween. The lifting shaft 11 can move in a vertical direction (Z-direction) relative to the base 10, thereby vertically moving the arm 12 and a hand 14. The arm 12 is formed by connecting at least two links. The hand 14 is connected to the arm 12. The robot 1 or the arm 12 is what is called a horizontal articulated type. In the robot 1, a plurality of rotation axes A1, A2, . . . are set so as to be oriented in parallel with each other in a plurality of connection portions. Any rotation axes A1, A2, . . . are also oriented in the vertical direction (Z-direction).

"The plurality of connection portions" include a connection portion between the base 10 and the arm 12, a connection portion between two adjacent links among links constituting the arm 12, and a connection portion between the arm 12 and the hand 14. A number of rotation axes in the robot 1 corresponds to a number of connection portions provided from the base 10 to the hand 14. For example, in the first embodiment, the arm 12 includes two links of a first link 13a and a second link 13b, and three connection portions and three rotation axes are set in the robot 1. (When the number of links is at least three, at least four rotation axes are set in the robot 1.)

A base end of the first link 13a is connected to the base 10 so as to be rotatable around the rotation axis A1. The base end of the second link 13b is connected to the front end of the first link 13a so as to be rotatable around the rotation axis A2. The hand 14 is connected to the front end portion of the second link 13b so as to be rotatable around the rotation axis A3. The links 13a, 13b and the hand 14 can swing in a horizontal plane (XY-plane). The hand 14 can move along any locus (including a straight line and a curved line) within a horizontal plane according to a posture of the arm 12 (a rotation angle around each of rotation axes A1 to A3).

Three rotation axes A1 to A3 are referred to as a first axis A1, a second axis A2, and a third axis A3 in order from the axis closest to the base 10. The rotation angle around the first axis A1 is referred to as a first rotation angle $\varphi1$, the rotation angle around the second axis A2 is referred to as a second rotation angle $\varphi2$, and the rotation angle around the third axis A3 is referred to as a third rotation angle $\varphi3$. The connection portion (in this embodiment of the two link type, the connection portion between the first link 13a and the second link 13b) in which the central second axis A2 is set is referred to as an "elbow joint Je" for convenience.

Figure 2:
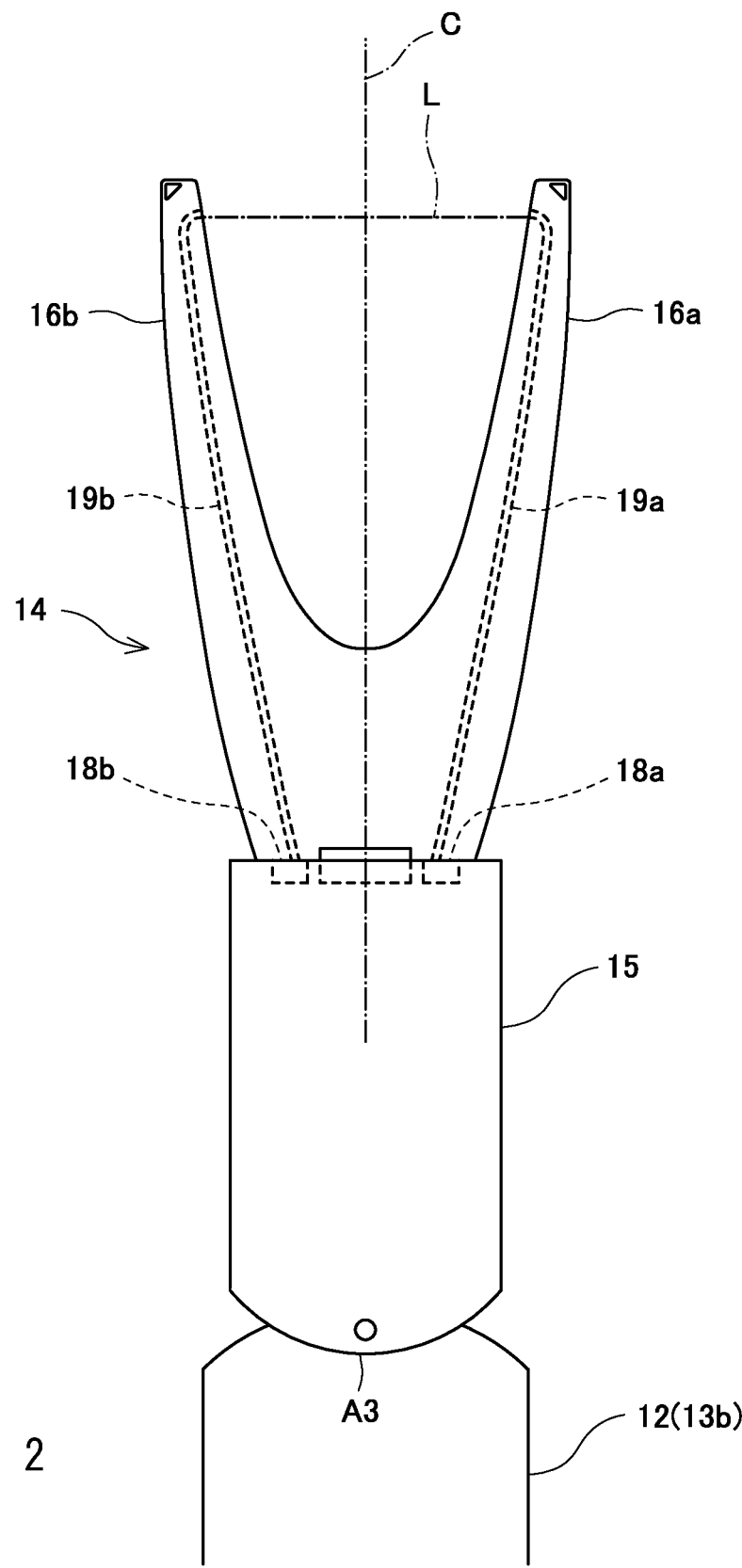
FIG. 2 is a plan view illustrating a hand according to the first embodiment.

FIG. 2 illustrates the hand 14. The hand 14 has a thin plate shape. The hand 14 extends horizontally from the front end of the arm 12. The disk-shaped substrate S can be held on an upper surface of the hand 14, whereby the substrate S is kept in a substantially horizontal posture. A holding structure is not particularly limited, but an edge grip type or a suction type can be adopted. When the arm 12 and the hand 14 lift and/or swing while the hand 14 holds the substrate S, the robot 1 can transfer the substrate S along any trajectory in the X-, Y- and/or Z-direction while kept in a horizontal posture.

The hand 14 is formed into a U-shape in planar view. The hand 14 includes a single base end 15 and a first front end 16a and a second front end 16b that are bifurcated from the base end 15. The hand 14 is symmetrical with respect to a center line C in planar view. The base end 15 of the hand 14 is connected to the arm 12 such that the rotation axis A3 is located on the center line C.

The sensor 17 is an optical sensor that forms detection light L propagating in a space between the first front end 16a and the second front end 16b of the hand 14. The detection light L has a beam shape, and is linearly formed in the space. The sensor 17 detects whether an object blocks the detection light L, namely, whether the object exists in the space. In the first embodiment, the sensor 17 is constructed with a transmission type, but may be constructed with a reflective type. The sensor 17 includes a light emitting element 18a and a light receiving element 18b. The light emitting element 18a is driven by the control device 20 to emit detection light L. The detection light L is guided to the first front end 16a through an optical fiber 19a, and output from the first front end 16a to the space. When the object does not exist in the space, the detection light L travels linearly in the space, is incident on the second front end 16b, and is guided to the light receiving element 18b through an optical fiber 19b. The light receiving element 18b outputs a signal corresponding to an amount of received light to the control device 20. A characteristic of the signal output from the sensor 17 changes depending on whether the object blocks the detection light L. The control device 20 can determine whether the detection light L is blocked based on a difference in signal characteristic.

Figure 3:
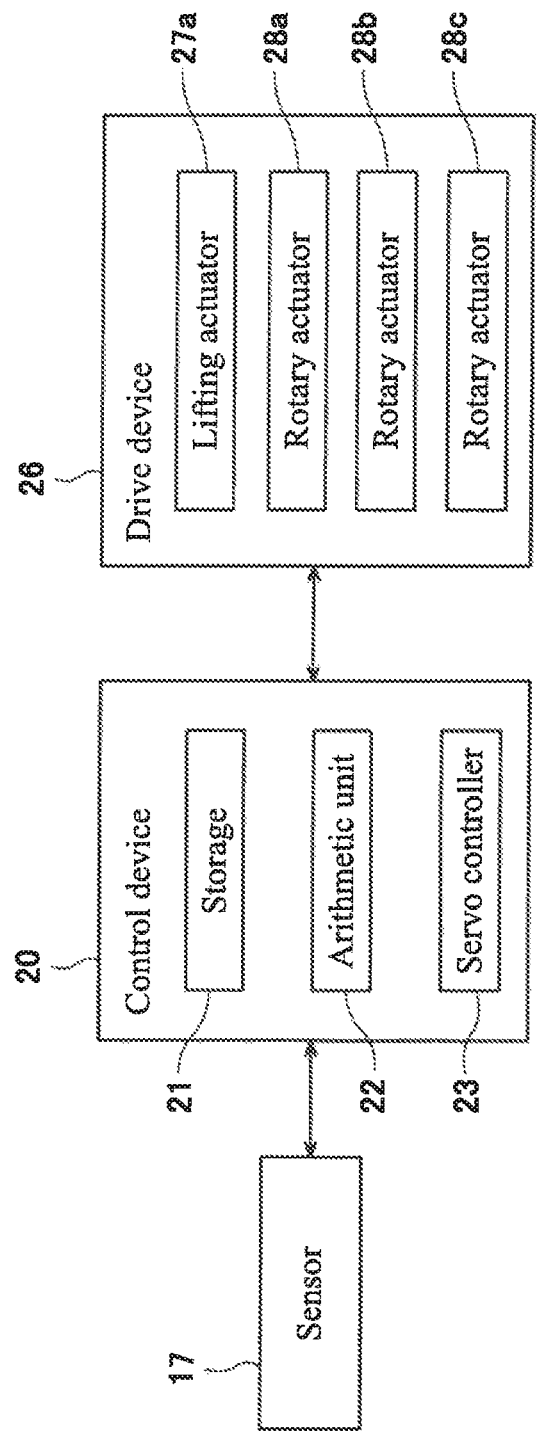
FIG. 3 is a block diagram illustrating a control system of the robot according to the first embodiment.
Figure 4:
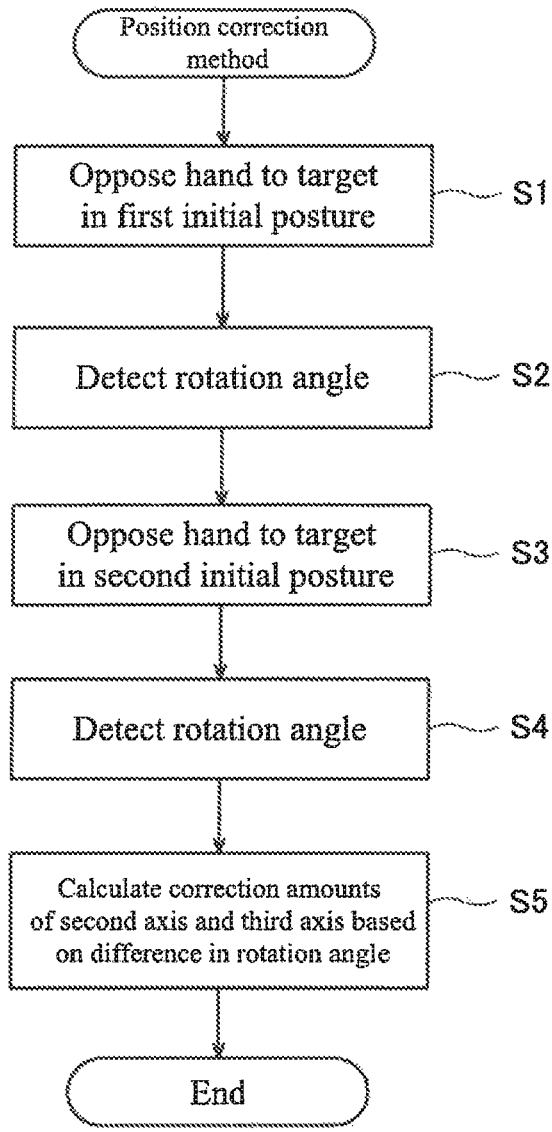
FIG. 4 is a flowchart illustrating a method of correcting a position of the robot according to the embodiment.

FIG. 3 illustrates a control system of the robot 1. The control device 20 controls operation of the arm 12 and the hand 14. The control device 20 is a robot controller including a computer such as a microcontroller. The control device 20 is not limited to a single device, but may be constructed with a plurality of devices.

The control device 20 includes a storage 21, an arithmetic unit 22, and a servo controller 23. The storage 21 stores information such as a basic program of the control device 20, an operation program of the robot 1, and data acquired during execution of the operation program. The operation program includes not only a work program causing the robot 1 to automatically perform conveying work of the substrate S in practical use in the semiconductor processing facility but also a program correcting a positional deviation caused by an error such as a machining error, an assembly error, and/or an installation error of the robot 1 in advance of the work. The "positional deviation" means a difference between the position, posture, or coordinate (hereinafter sometimes referred to as a software value) of the arm 12 or the hand 14, which are recognized by the control device 20, and the actual position, posture, or coordinate (hereinafter sometimes referred to as an actual value) of the arm 12 or the hand 14, which are generated by the error. A position correction method of the first embodiment is performed by executing the program for the correction.

The arithmetic unit 22 performs arithmetic processing for robot control, and generates a control command of the robot 1. The servo controller 23 controls a drive device 26 of the robot 1 based on the control command generated by the arithmetic unit 22. For example, the drive device 26 includes a lifting actuator 27a (for example, an air cylinder) that lifts the lifting shaft 11 and a plurality of rotary actuators 28a, 28b, and 28c (for example, electric motors) corresponding to the rotation axes A1 to A3. The drive device 26 moves the hand 14 according to the control command from the control device 20. In the following description, a change in posture or position of the arm 12 and the hand 14 are performed through the control performed by the control device 20.

The position correction method performed by the program executed by the control device 20 and the operation of the robot 1 accompanied by the execution of the program will be described below. As a premise for performing the position correction method, a target 40 is installed within the movable range of the robot 1 (at a position where the hand 14 is accessible). The target 40 may be detachably installed in the semiconductor processing facility by a worker, or previously installed in an interior or an outer surface of the cassette 2.

A shape, a posture during the installation, and an installation place of the target 40 are arbitrary. As an example, the target 40 may be formed into a columnar shape, or may be what is called a "pin". In this case, the target 40 has a circular horizontal section. As another example, only a part of the horizontal section of the target 40 may be formed into a circular arc. As an example, the target 40 is installed in a posture extending in the vertical direction. The target 40 may be installed in an interior or an outer surface of the cassette 2, or installed in a jig simulating a wafer. The jig may be accommodated in the cassette 2. In the following description, it is assumed that the center of the target 40 is a circle in the horizontal section of the target 40 or a center of the circular arc.

In the position correction method, the hand 14 is opposed to the target 40 while the arm 12 is in a first initial posture (S1). Subsequently, the hand 14 is swung to detect a position of the center of the target 40 based on the rotation angle around the plurality of rotation axes (S2). In the detection, the technique taught in U.S. Pat. No. 9,796,086 B2 can suitably be applied, and incorporated by reference herein. In an outline, the hand 14 is rotated around the third axis A3 due to the swing of the hand 14. In order to detect the position, the output of the sensor 17 is monitored to determine whether the target 40 blocks the detection light L, and the rotation angles of the first axis A1, the second axis A2 and the third axis A3 are acquired when the target 40 blocks the detection light L. The hand 14 is opposed to the target 40 in a second initial posture different from the first initial posture (S3). Similarly to step S2, the hand 14 is swung to detect a position of the center of the target 40 based on the rotation angle around the plurality of rotation axes (S4).

Figures 5A, 5B, 5C, 5D:
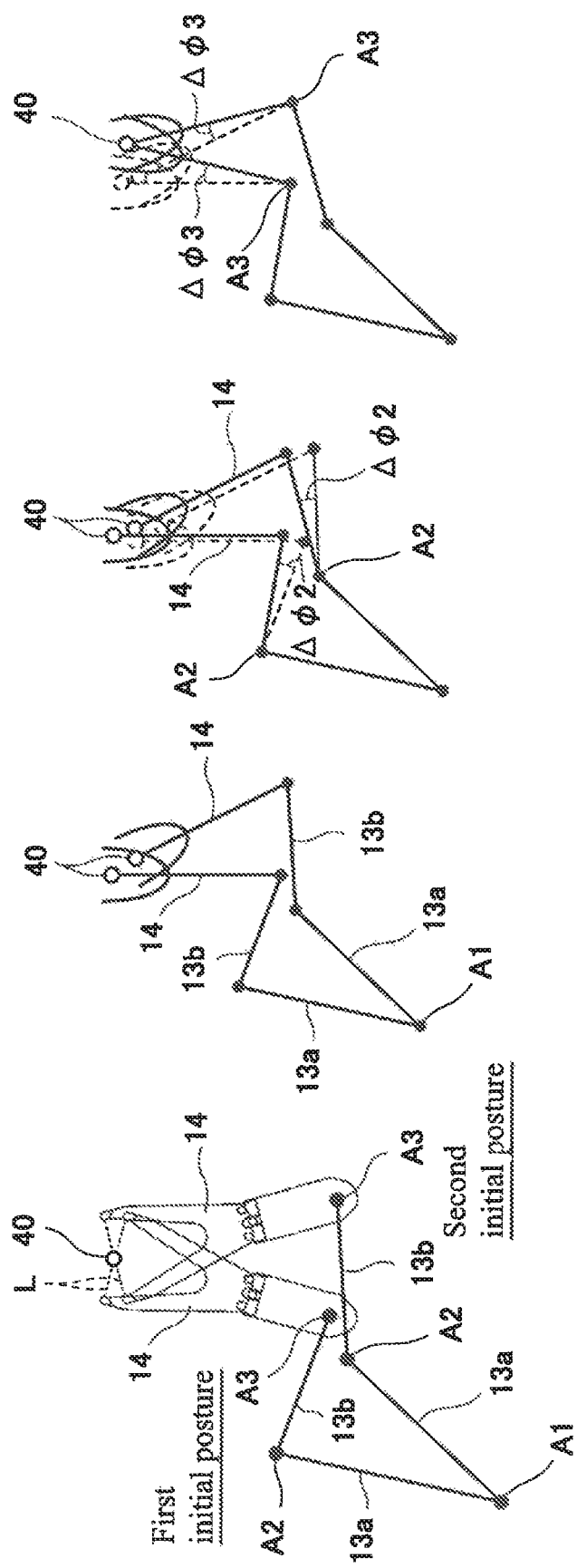
FIG. 5A is a view illustrating a positional relationship between a hand and a target in an ideal state.
FIG. 5B is a view illustrating the positional relationship between the hand and the target that can actually be generated.
FIG. 5C is a view illustrating a correction amount of a second axis.
FIG. 5D is a view illustrating a correction amount of a third axis.

The positions of the centers of the two detected targets 40 are not perfectly matched with each other due to the above error, but a difference is generated between the two positions. A correction amount eliminating the difference is a correction amount eliminating the error. For example, the correction amount eliminating the error is calculated based on the difference between the two positions (S5). The correction amount is obtained with respect to the rotation angles of the second axis A2 and the third axis A3. Specifically, when the arm 12 is rotated around the second axis A2 by an identical correction amount $\Delta\varphi 2$ from the first initial posture and the second initial posture (see FIG. 5C), and when the arm 12 is further rotated around the third axis A3 by an identical correction amount $\Delta\varphi 3$ from the first initial posture and the second initial posture (see FIG. 5C), the correction amounts $\Delta\varphi 2$, $\Delta\varphi 3$ are obtained such that the front end of the hand 14 is located at the identical position.

By adding the obtained correction amounts $\Delta\varphi 2$, $\Delta\varphi 3$ to the software values, the initial error can be absorbed to calibrate the initial position of the robot 1, and the position control accuracy is improved.

Figure 6:
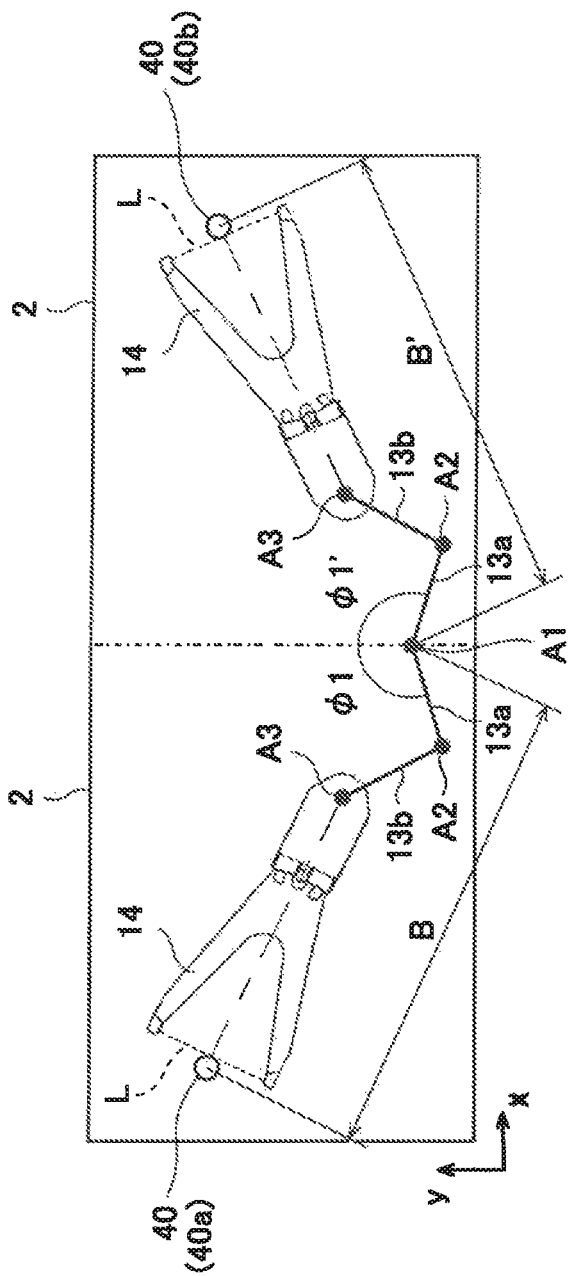
FIG. 6 is a view illustrating a position correction method according to a second embodiment.

As illustrated in FIG. 6 of a second embodiment, in the case that two targets exist, the rotation angle of the first axis A1 can also be corrected. At this point, the two targets are referred to as a first target 40a and a second target 40b. In ideal disposition, two targets 40a, 40b are installed such that the distance from the first axis A1 to the first target 40a and the distance from the first axis A1 to the second target 40b are equal to each other. In the EFEM including at least two cassettes 2, the targets 40a, 40b are easily disposed. The first target 40a is installed in one of the cassettes 2, and the second target 40b is installed in another cassette 2. However, due to the above error, the two distances are not necessarily equal to each other. Because the second axis A2 and the third axis A3 are corrected through the correction amount arithmetic step, the final position correction is performed by correcting the software value relating to the first axis A1.

Specifically, the hand 14 is moved toward the first target 40a, the sensor 17 is monitored, and the first target 40a is caused to block the detection light L. A distance B from the first axis A1 to the first target 40a and the rotation angle $\varphi 1$ of the first axis A1 are acquired when the first target 40a blocks the detection light L. In the similar manner, the hand 14 is moved toward the second target 40b, and a distance B' from the first axis A1 to the second target 40b and the rotation angle $\varphi 1'$ of the first axis A1 are acquired.

When the distance from the first axis to the first target is actually equal to the distance from the first axis to the second target, the acquired two distances are equal to each other, and the first rotation angle acquired in the first posture and the second rotation angle acquired in the second posture are equal to each other. When the distance from the first axis to the first target is different from the distance from the first axis to the second target, it means that an error exists in the two distances and/or the attachment of the actuator around the first rotation axis. For this reason, when the distance from the first axis to the first target is different from the distance from the first axis to the second target, the correction amount correcting the distance is calculated. When a difference in absolute value of the first rotation angle exists, the correction amount eliminating the difference is calculated.

In the second embodiment, not only the second axis A2 and the third axis A3 but also the rotation angle of the first axis A1 and the distances to the two targets 40a, 40b can be corrected, and the accuracy of the position control can be further improved.

Although the embodiments have been described above, the configuration and method can be added, changed, and/or deleted within the scope of the present invention.

For example, as described above, the present invention can similarly be applied to the arm including at least three links. In the case of the three link, four rotation axes are provided. In this case, when the above method is applied, for example, three rotation axes are set as the third axis, the second axis, and the first axis in order from the side of the hand 14, but the rotation axis in the connection portion between the base 10 and the arm 12 is not operated. Consequently, the rotation angles of the first to third axes defined above can be corrected. Subsequently, three rotation axes are set as the first axis, the second axis, and the third axis in order from the side of the base 10, but the rotation axis in the connection portion between the hand 14 and the arm 12 is not operated. Consequently, even in a robot having at least four rotation axes, the correction accuracy can be improved and the position control accuracy is improved.

What is claimed is:
1. A method of correcting a position of a robot, the robot including:
   a base;
   an arm that is formed by connecting at least two links and connected to the base;
   a hand that is connected to the arm and includes a first front end and a second front end that are bifurcated;
   a sensor that is configured to propagate detection light between the first front end and the second front end and to detect whether a target blocks the detection light; and
   a controller that controls operation of the arm and the hand,
   a plurality of rotation axes being set so as to be parallel to each other at each of a plurality of connection portions,
   the plurality of connection portions including a connection portion of the base and the arm, a connection portion of two adjacent links among the links constituting the arm, and a connecting portion of the arm and the hand,
assuming that three of the rotation axes are a first axis, a second axis, and a third axis in order from the rotation axis closest to the base, the method comprising:

a step of opposing the hand to the target by moving the hand such that the hand becomes in a predetermined first initial posture;

a first position detection step of detecting a rotation angle of the rotation axis when the target blocks the detection light by swinging the hand;

a step of opposing the hand to the target by moving the hand such that the hand becomes a predetermined second initial posture different from the first initial posture;

a second position detection step of detecting the rotation angle of the rotation axis when the target blocks the detection light by swinging the hand; and a correction amount arithmetic step of obtaining rotation angle correction amounts of the second axis and the third axis based on a difference between the rotation angle of the rotation axis acquired in the first initial posture and the rotation angle of the rotation axis acquired in the second initial posture.

2. The method of correcting a position according to claim 1, wherein in the first position detection step, a position of the target is obtained from the rotation angle of the rotation axis when the target blocks the detection light, in the second position detection step, a position of the target is obtained from the rotation angle of the rotation axis when the target blocks the detection light, and in the correction amount arithmetic step, the rotation angle correction amount is obtained based on a difference between the position obtained in the first position detection step and the position obtained in the second position detection step.

3. The method of correcting a position of a robot according to claim 1, wherein the target includes a first target and a second target, while the rotation angle correction amounts of the second axis and the third axis are taken into consideration, one of the first and second position detection steps is performed using the first target, and the other of the first and second position detection steps is performed using the second target, and the rotation angle correction amount of the first axis is obtained based on data of a distance from the first axis acquired from the two position detection steps to the target and data of the rotation angle of the first axis.

4. A robot comprising:

a base;

an arm that is formed by connecting at least two links and connected to the base;

a hand that is connected to the arm and includes a first front end and a second front end that are bifurcated;

a sensor that is configured to propagate detection light between the first front end and the second front end and to detect whether a target blocks the detection light; and a controller that is configured to control operation of the arm and the hand, wherein a plurality of rotation axes are set so as to be parallel to each other at each of a plurality of connection portions, the plurality of connection portions includes a connection portion of the base and the arm, a connection portion of two adjacent links among the links constituting the arm, and a connecting portion of the arm and the hand, and assuming that three of the rotation axes are a first axis, a second axis, and a third axis in order from the rotation axis closest to the base, the controller:

opposes the hand to the target by moving the hand such that the hand becomes in a predetermined first initial posture;

detects a rotation angle of the rotation axis when the target blocks the detection light by swinging the hand;

opposes the hand to the target by moving the hand such that the hand becomes a predetermined second initial posture different from the first initial posture;

detects the rotation angle of the rotation axis when the target blocks the detection light by swinging the hand; and obtains rotation angle correction amounts of the second axis and the third axis based on a difference between the rotation angle of the rotation axis acquired in the first initial posture and the rotation angle of the rotation axis acquired in the second initial posture.

* * * * *